US008688510B2

(12) United States Patent  
Namdar

(10) Patent No.: US 8,688,510 B2  
(45) Date of Patent: Apr. 1, 2014

(54) METHOD FOR FEE CHARGING POSITION USAGES OF VEHICLES

(75) Inventor: Nader Namdar, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 123 days.

(21) Appl. No.: 13/412,132

(22) Filed: Mar. 5, 2012

(65) Prior Publication Data

US 2012/0265583 A1 Oct. 18, 2012

(30) Foreign Application Priority Data

Apr. 15, 2011 (EP) .................................. 11450050

(51) Int. Cl.
*G07B 15/00* (2011.01)
*G06Q 20/00* (2012.01)

(52) U.S. Cl.
USPC .............................................. 705/13; 705/16

(58) Field of Classification Search
USPC ......... 705/13, 16; 340/928, 933, 937, 426.16, 340/5.2; 235/382, 382.5; 701/517, 408, 701/491, 482, 526, 527, 532, 537, 541
See application file for complete search history.

(56) References Cited

U.S. PATENT DOCUMENTS

| | | | | |
|---|---|---|---|---|
| 6,304,192 B1* | 10/2001 | Kawasaki | ...................... | 340/928 |
| 7,654,452 B2* | 2/2010 | Gravelle | ....................... | 235/383 |
| 2005/0010478 A1 | 1/2005 | Gravelle | | |
| 2010/0312618 A1* | 12/2010 | Ramsdale et al. | .............. | 705/13 |

OTHER PUBLICATIONS

Extended European Search Report for corresponding European Patent Application No. 11450050.7, dated Aug. 31, 2011, 7pp.
Security aspects of the EETS, Prepared by Expert Group 12 Working to support the European Commission on the work on Directive 2004/52/EC, issued Apr. 5, 2007, XP007916364, 86pp.
The CESARE Project, XP-002654049, 3pp.

* cited by examiner

*Primary Examiner* — Igor Borissov
(74) *Attorney, Agent, or Firm* — Fiala & Weaver P.L.L.C.

(57) ABSTRACT

Method for charging position usages of vehicles in a road toll system including acquiring an identifier of a vehicle device, a transaction value and an identifier of a payment card as a payment transaction, authorization a payment transaction system and transmitting associated authorization data with the vehicle device identifier to a toll server, generating a substitute identifier assigned to the card identifier and transmitting the substitute identifier with the authorization data to the toll server, associating the substitute identifier and the vehicle device identifier based on the respective received authorization data, calculating toll values based on position usages of vehicles, based on the card identifier assigned to substitute identifier, the transmitted toll values and the transaction value.

10 Claims, 2 Drawing Sheets

METHOD FOR FEE CHARGING POSITION USAGES OF VEHICLES

CROSS-REFERENCE TO RELATED APPLICATION(S)

This application claims priority to European Patent Application No. 11 450 050.7, filed on Apr. 15, 2011, the contents of which are hereby expressly incorporated by reference.

FIELD OF THE INVENTION

The present invention relates to a computer implemented method for charging fees for position usages of vehicles in a road toll system by a separate payment transaction system.

BACKGROUND

Position usages of vehicles in electronic road toll systems are determined with the aid of in-vehicle devices, such as, Onboard Units (OBUs) carried by the vehicles, which communicate for this purpose via short-range radio, e.g., dedicated short-range communication (DSRC) with geographically distributed radio beacons (DSRC beacons) or, using a global satellite navigation system (GNSS), with the assistance of self-locating GNSS OBUs. In cases, where the beacons are directly connected to the toll center in DSRC systems, GNSS OBUs generally transmit the ascertained data to the central toll computer server via mobile radio.

Fee charging is generally done in such road toll systems based on prepayment of the amount of money, which can additionally include a security deposit for the vehicle device. When a vehicle device is returned, e.g., at the toll terminal of a decentralized distributor station before crossing a border or boundary, the toll server calculates the sums of money that have been paid in and used up to that point. This is associated with waiting times and undesirable cash reserves or complicated (international) bank transfers at the respective distributor station.

Because of the high expense and low flexibility of such methods for fee charging, it would be desirable to be able to realize the charging in the road toll system by an established noncash payment transaction system, based on payment cards. Determining, paying, adjusting payments and charging a transaction value are considerably more flexible and secure if payment cards such as credit cards are used. The disadvantage may be that the road toll system that has to handle the payment transactions must be included in the highly elaborate processes of the payment transaction system. Such payment transaction systems require complex processes for securing the handling of payment card transactions. The associated recording and verifications that must be constantly produced to maintain established certifications and meet standards for payment transaction systems, such as the Payment Card Industry Data Security Standards (PCI-DSS), are a tremendous burden on the road toll system and especially the central toll server and do not constitute a central responsibility of the road toll system. Thus, data access would have to be treated very restrictively. It would be necessary to encrypt a considerable amount of data, all data accesses would have to be checked and recorded, and frequent tests of all systems and processes would have to provided, documented and disclosed to approved testing institutions.

SUMMARY

The present invention creates a system for charging fees for position usages of vehicles in a road toll system that offers the flexibility and security of payment transaction systems with payment cards without having to meet the complicated standards of these payment transaction systems.

In some embodiments, the present invention is a computer implemented method for charging fees for position usages of vehicles in a road toll system by a payment transaction system, the road toll system comprising a central toll server and decentralized toll terminals connected thereto and at least one subsystem for determining the position usages of the vehicles in cooperation with respective vehicle devices carried by the vehicles, wherein the payment transaction system comprises a transaction server and decentralized transaction terminals connected thereto for charging payment transactions by payment cards, and wherein at least one toll terminal is connected to at least one transaction terminal.

The method includes: receiving an unambiguous identifier of a vehicle device by a toll terminal; receiving a transaction value and an unambiguous card identifier of a payment card by a transaction terminal as a payment transaction, transmitting an authorization request containing the payment transaction from the transaction terminal to the transaction server, and authorizing the payment transaction and generating associated authorization data in the transaction server; transmitting the authorization data from the transaction server to the transaction terminal and transmitting the authorization data to the toll terminal; generating a substitute identifier unambiguously assigned to the card identifier in the transaction server; transmitting the authorization data and the substitute identifier from the transaction server to the toll server; transmitting the authorization data and the vehicle device identifier from the toll terminal to the toll server; associating the substitute identifier and the vehicle device identifier in the toll server based on the authorization data received with the substitute identifier and the vehicle device identifier; determining position usages of a vehicle carrying the vehicle device; calculating at least one toll value based on the position usages determined with respect to the vehicle device identifier of said vehicle in the road toll system; transmitting a charging request containing the vehicle device identifier from a toll terminal to the toll server; determining the substitute identifier assigned to the received vehicle device identifier in the toll server and transmitting the determined substitute identifier and said at least one calculated toll value from the toll server to the transaction server; and determining the card identifier assigned to the received substitute identifier in the transaction server and charging said at least one calculated received toll value, based on the card identifier.

In some embodiments, the transaction value is also transmitted in the step of transmitting the authorization data and the vehicle identifier from the toll terminal, or in the step of transmitting the authorization data and the substitute identifier to the toll server. Accordingly, the transaction value transmitted in advance is always available, as a toll value limit for example, to the toll server when it is calculating toll values based on the acquired position usages. In some embodiments, the transaction value is sent both from the toll terminal and from the transaction server to the toll server, since the toll server can undertake a data comparison in this case, and the transmitted data has an additional identification feature.

In some embodiments, extra personal and/or vehicle-related data are acquired in the step of inputting the vehicle device identifier at the toll terminal and is transmitted in the step of transmitting the authorization data and the vehicle device identifier from the toll terminal to the toll server. This data makes it possible for the road toll system both to further individualize the charging by creating charges related to persons and/or vehicles, and to ensure correct position usages by checking—at least on a random sample basis—the position usages of vehicles based on the vehicle identification numbers or other acquired personal and/or vehicle-related data.

In some embodiments of the invention, the road toll system comprises at least one subsystem that determines position usages of vehicles via a network of geographically distributed radio beacons that communicate with vehicle devices via dedicated short-range communication. Alternatively or additionally, the road toll system in another embodiment comprises at least one subsystem that determines position usages of vehicles via self-locating vehicle devices using a global satellite navigation system that communicate with the toll server via a wireless network. The present method can thus be used flexibly, independently of how the position usages of vehicles are obtained for calculating toll values.

In some embodiments, the step of inputting the transaction value into the transaction terminal takes place by data transmission from the toll terminal to the transaction terminal. Thereby the transaction value can first be simply input into the toll terminal and forwarded for the payment transaction to the transaction terminal, which leads to a greater convenience and lower risk of error as compared to the manual input of the transaction value at the transaction terminal. In addition, the transaction value is immediately available to the toll terminal for routing to the toll server in such an embodiment.

In some embodiments, a credit card payment transaction system is used as the payment transaction system. In that way, the road toll system in the described method can rely upon the particularly high flexibility and security of credit card payment transactions, without having to execute the payment transactions on its own, and can advantageously benefit from the dissemination and international applicability of credit cards.

BRIEF DESCRIPTION OF THE DRAWINGS

Further characteristics and advantages of the invention follow from the description below of exemplary embodiments with reference to the accompanying drawings, in which.

DETAILED DESCRIPTION

Figure 1:
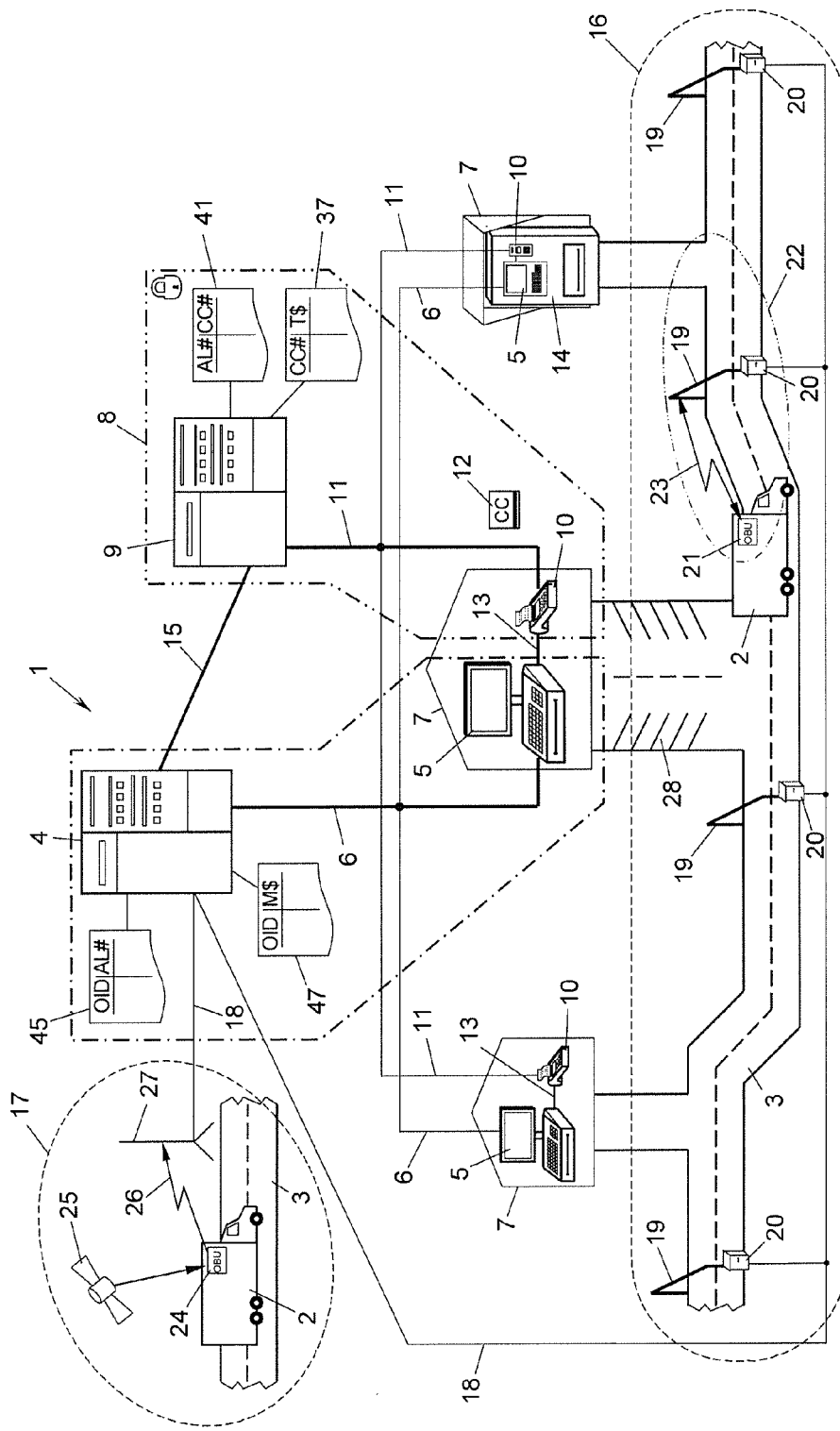
FIG. 1 schematically shows a physical structure of a road toll system and a payment transaction system and their cooperation, according to some embodiments of the present invention.

The present invention is directed to a method executed by one or more computers for charging fees for position usages by vehicles in a road toll system by a separate payment transaction system. The road toll system may comprise a central toll computer server and decentralized toll terminals connected thereto, and at least one subsystem for determining the position usages of the vehicles in cooperation with the vehicle devices carried by the vehicles. The payment transaction system may comprise a transaction computer server and decentralized transaction terminals connected thereto for charging payment transactions by payment cards, and at least one toll terminal is connected to at least one transaction terminal. The terminals may include one or more processors with associated memories.

In the described method, the toll server does not have data of the payment card or data of payment transaction system at any time, apart from the anonymous substitute identifier, just as the payment transaction system does not have data of the toll server or the road toll system at any time, apart from the final toll values to be charged. The subsystem can continue to determine the position usages based on the vehicle device identifiers, the toll computer server can continue to calculate the toll values, based on the vehicle device identifiers and the transaction computer server can continue to settle the payment transactions based on the card identifiers known to it. A substitute identifier is generated exclusively in the standardized secure payment transaction system and thereafter is no longer modified, nor is it used in the settlement of payment transactions, for which reason it has no effect on security inside the payment transaction system.

The acquisition of position usages and the calculation of the toll values in the toll server, the handling of payment transactions and the charging of toll values to a payment card in the payment transaction server, work efficiently side by side while exchanging the smallest possible amount of data, without mutual integration. As a result, the toll computer server is not further burdened, and the flexibility and security of the payment transaction system are preserved.

Since the road toll system uses only common identifiers such as the vehicle device identifier for determining the position usages and for calculating the toll values, and the substitute identifier of the payment card is not used until charging on request, existing processes in the road toll system also remain largely unaffected, which substantially simplifies the retrofitting of existing road toll systems, in addition to an easier conversion to the described method. The handling of payment transactions in payment transaction systems also remains completely unaffected and is only supplemented with the steps of creating and transmitting authorization data and the substitute identifier, which considerably simplifies the integration into existing payment transaction systems with payment cards and their standards (such as PCI-DSS).

FIG. 1 shows a road toll system 1 for determining and tolling position usages of vehicles 2 that are moving on roads 3. The road toll system 1 comprises a central toll server 4, which is connected to a plurality of decentralized toll terminals 5 via data connections 6. The toll terminals 5 are arranged at distributor stations 7.

A payment transaction system 8 for charging position usages of the vehicles 2 comprises a central transaction server 9, which is connected to a plurality of decentralized transaction terminals 10 via data links 11. The payment transaction system 8 is a secured transaction system based on payment cards 12 such as credit cards, debit cards or prepaid cards, in which the payment transaction takes place in an online process via communication between the transaction server 9 and the respective transaction terminal 10, which has an unambiguous transaction terminal identifier PID for this purpose. For its part, a payment card 12 has an unambiguous identifier CC# and a user code PIN if appropriate.

The payment transaction system 8 is constructed and certified according to the strictest data security specifications and standards such as the Payment Card Industry Data Security Standard (PCI-DSS), the Visa® Account Information Security program (AIS and its sister program CISP), the MasterCard® Site Data Protection program (SDP), the American Express® Security Operating Policy (DSOP), the Discover Information Security and Compliance (DISC) or the JCB® security rules and comparable payment transaction methods such as those using the Maestro® SecureCode or the MasterCard® SecureCode™.

Like the toll terminals 5, the transaction terminals 10 are arranged at or in the distributor stations 7 and communicate with them via a data link 13. The toll terminal 5 serves as an input point for data that is intended for the toll server 4 and routes data that it obtains from the transaction terminal 10 to the toll server 4. As illustrated in FIG. 1, the toll terminal 5 can be configured, for example, as a cash register system in a toll machine or consumption machine, e.g., at national boundaries or gas stations. The transaction terminal 10 serves as a local user interface for the payment transaction and can be equipped with a card reader for the payment card 12 and a simple keypad for data input. Distributor stations 7 with both terminals 5 and 10 can be configured in the form of integrated machines 14 for self-service, as illustrated.

There is an additional data link 15 between the transaction server 9 and the toll server 4 for direct data exchange between the two, as will be described in more detail below. Both the transaction server 9 and the toll server 4 should not necessarily be conceived of as respective individual self-enclosed computation units, but can instead be parts of such computation units or parts of possibly geographically distributed server farms or parts of different computer systems, e.g., in a banking institution or a road system operator.

The data links 6, 11 and 15 can be configured in the form of fixed wire lines, possibly with proprietary data transmission protocols, Internet connections (e.g., in the form of a virtual private network, VPN) or as wireless links such as mobile radio or satellite-based communication, existing permanently or constructed as needed (e.g., by dial-up modems, as packet-switched data sessions, or the like). Any combination of connection types is also possible, so that remote, seldom used toll or transaction terminals 5, 10 set up dial-up links, while toll or transaction terminals 5, 10 at heavily frequented positions can be permanently connected to the toll server and the transaction server 4, 9.

The toll server 4 is connected to subsystems 16, 17 for determining position usages of vehicles 2, which subsystems 16, 17 are likewise part of the road toll system 1. The data links 18 used for this purpose can be constructed in various manners, as discussed in connection with the data links 6, 11, 15.

The subsystem 16, has geographically distributed dedicated short-range communication beacons, (DSRC beacons) 19 with local computing units 20. If a vehicle device (On-board Unit, OBU) 21 carried by a vehicle 2 enters the radio range 22 of a DSRC beacon 19, then this DSRC beacon 19 and the OBU 21 set up a communications link 23. The usage of the section or position of the street 3 lying in the radio range 22 of the DSRC beacon 19 by the vehicle 2 is recognized from this communication link 23. Familiar short-range links such as infrared links, Wireless Access in Vehicular Environments (WAVE), Wireless Local Area Network (WLAN), Wi-Fi®, Bluetooth®, etc., are suitable as the communication link 23.

The position usages are determined in the road toll system 1, based on an unambiguous vehicle device or OBU identifier OID that is assigned to each OBU 21 and sent to the DSRC beacon 19 with the communication link 23. For example, the DSRC beacons 19 transmit the data acquired in the communication connections 23 together with unambiguous beacon identifiers BID of the DSRC beacons 19 to the toll server 4 via the data links 18.

The subsystem 17, which acquires the position usages of the vehicles 2 with the aid of OBUs 24 that locate themselves using a global satellite navigation system 25. The OBUs 24 communicate via a wireless link 26 with a wireless network 27 that transmits the obtained position usages to the central terminal server 4 via the data link 18. The wireless link 26 and the wireless network 27 are preferably a cellular mobile radio network. However, this connection can also be set up via one of the dedicated short-range communication links 23 and DSRC beacons 19, or other suitable radio networks in communication with the toll server 4.

Position usages of vehicles 2 that are acquired and tolled in the road toll system 1 can be of any type, whether it be driving on a toll road such as the road 3 or a section thereof, driving into a specific area (city-center areas, national parks, tunnels, etc.) or being stationary in an area such as a parking lot 28, etc. The toll to be charged for the position usage can be related to the distance traveled (distance toll) and/or the duration of usage (time toll).

Figure 2:
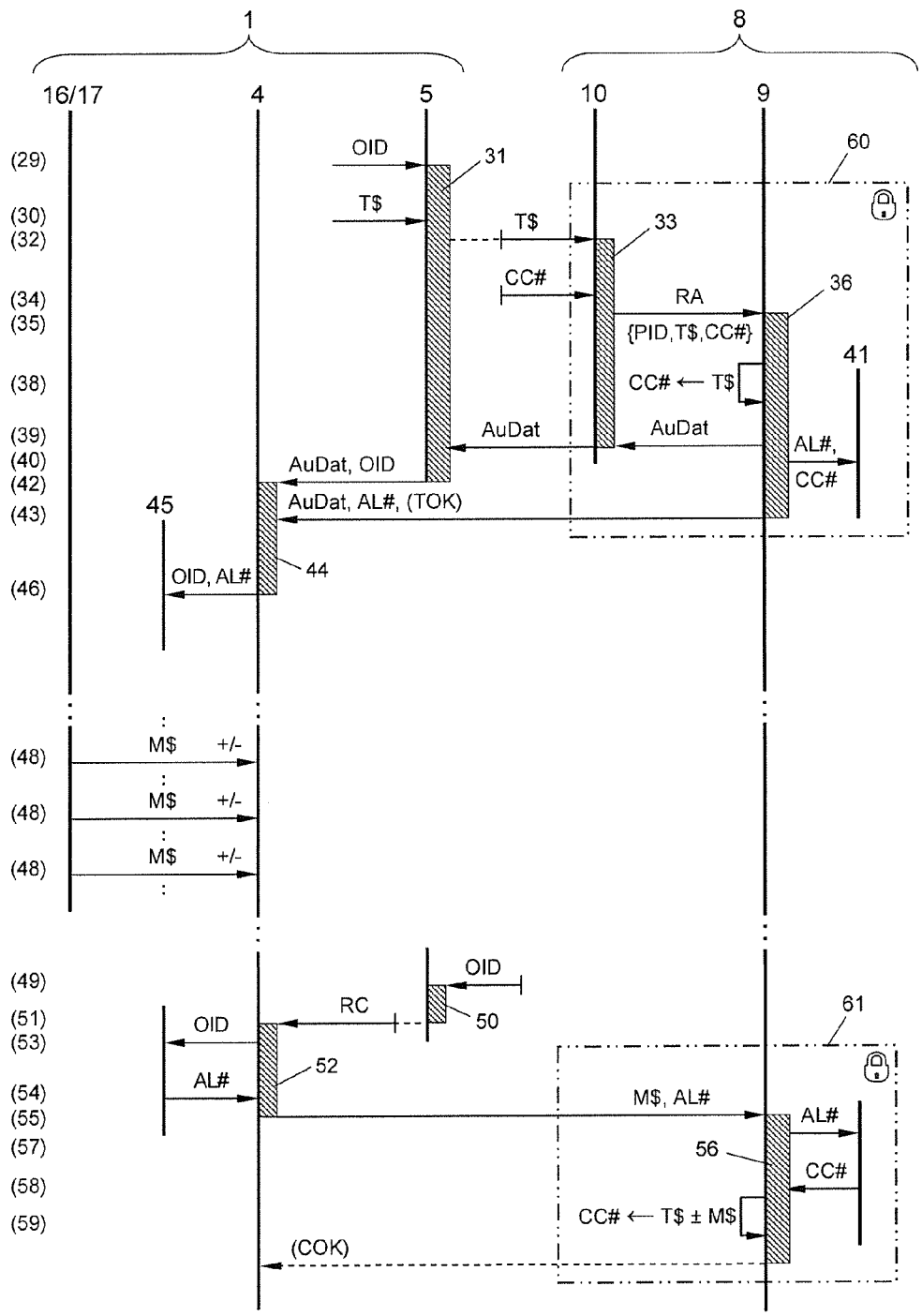
FIG. 2 shows an exemplary sequence diagram, according to some embodiments of the present invention.

FIG. 2 shows the method for charging the position usages of the vehicles 2 in detail. The method begins with the input of a vehicle device identifier OID in step 29 and the transaction value T$ in a step 30 into one of the toll terminals 5, which initiates a process 31 therein. The transaction value T$ serves, for example, as a prepayment for a toll to be charged later and can also comprise a security deposit for the OBU 21, 24. In some embodiments, the transaction value T$ could be merely a symbolic amount, e.g., 1 euro cent in order to initiate a transaction.

The order of the steps 29 and 30 is arbitrary, that is, the vehicle device identifier OID can also be input into the process 31 at a separate point in time. The process 31 is used to record and collect the information of the transaction that is necessary from the point of view of the road toll system 1 and route it to the toll server 4.

The transaction value T$ can be determined in step 30 and input manually, specified as a fixed value or selected from an already prepared list in the toll terminal 5. In step 32, the transaction value T$ is sent to the transaction terminal 10 connected to the toll terminal 5 via the link 13, in order to initiate an authorization process 33. As indicated in FIG. 2, the transaction value T$ can alternatively also be input in step 32 directly at the transaction terminal 10, in which case step 30 is unnecessary.

In step 34, the card identifier CC# of a payment card 12 is input into the transaction terminal 10, e.g., by reading the payment card 12 at a card reader of the transaction terminal 10 or by inputting the card identifier CC# via a keypad. The input of a user code PIN and additional, e.g., user-related information, at the transaction terminal 10 can be optionally provided, depending on the payment transaction system 8 being used.

The order of the input of the transaction value T$, card identifier CC# and optionally the user code PIN and additional data at transaction terminal 10 is arbitrary and is generally specified by the payment transaction system 8.

If all data necessary for the payment transaction has been acquired in the transaction terminal 10, the latter transmits, optionally following an acknowledgment, an authorization request RA to the transaction server 9 (step 35). The authorization request RA contains the identifier of the transaction terminal PID, the transaction value T$, the card identifier CC# and optionally the user code PIN and additional user data.

In some embodiments of the invention, several vehicle device identifiers are assigned a single substitute identifier in the toll server under a contract identifier. Such a procedure facilitates the assignment and charging of position usages by vehicles from motor pools and in case of frequent exchange of the vehicle devices, for example in rental vehicles.

With the reception of the authorization request RA {PID, T$, CC#} in the transaction server 9, a process 36 starts for authorizing the payment transaction and generating a substitute identifier AL$ for the card identifier CC#. The transaction server 9 checks the data received for the payment transaction in step 35 with the authorization request RA for validity. The precise process for validation can be derived from the state of the art for the respective payment transaction system 8 being used. The transaction server 9 can query a card account 37

(FIG. 1) managed by it and assigned to the respective payment card 12, as is illustrated in step 38, which can also be carried out at a different time in the process 36 or even after it is concluded.

After a positive check or validation, the transaction server 9 transmits authorization data AuDat as authorization for the payment transaction back to the transaction terminal 10, which routes it to the toll terminal 5 and terminates its authorization process 33 (step 39). The authorization data AuDat is unambiguous for each payment transaction. It can contain, for example, a time stamp of the transaction, the identifier PID of the transaction terminal 10 that was used and a digital certificate from the transaction server 9, as is familiar in the art.

The substitute identifier AL# generated in the process 36 for the card identifier CC# is unambiguously assigned to it and is stored in step 40 in the database 41 of the transaction server 9 for later use. The card identifier CC# cannot be derived only from knowledge of the substitute identifier AL#, but the latter can contain parts of the card identifier CC#, e.g., its final 4 digits, for plausibility purposes.

Thus, the authorization data AuDat obtained from the transaction server 9 via the transaction terminal 10, and the previously input vehicle device identifier OID, are present in the toll terminal 5 at the end of process 31. The authorization data AuDat and the vehicle device identifier OID are sent by the toll terminal 5 to the toll server 4 via the data link 6 in step 42, which terminates the process 31 in the toll terminal 5.

In some embodiments of the invention, the authorization data has an authentication code, a time stamp of the authorization and an unambiguous identifier of the above-mentioned transaction terminal. Since the authorization data is used for assigning the substitute identifier and the vehicle device identifier in the toll server, it is favorable if this data is as unambiguous as possible. By introducing a time stamp of the authorization into the authorization data, long-term recording and tracing of extensive authorization codes with respect to their uniqueness is unnecessary. The additional inclusion of the unambiguous identifier of the transaction terminal used for authorization into the authorization data further simplifies the creation and expansion of the authorization data.

In a comparable manner, the authorization data AuDat and the substitute identifier AL# are present in the transaction server 9 at the end of the process 36. This data is likewise transmitted in step 43 via the data link 15 to the toll server 4, which terminates the process 36 at the transaction server 9. A confirmation message TOK ("transaction ok") can optionally be transmitted by the transaction server 9 to the toll server 4 in step 43.

The two steps 42 and 43 are temporally independent of one another and can run in any desired order. The data transmitted therein can also contain more extensive data than the authorization data AuDat and the vehicle device identifier OID or substitute identifier AL#, for example the transaction value T$ as well as additional personal and/or vehicle-related data.

In a process 44, the toll server 4 then uses the authorization data AuDat, which it obtained via the data link 6 from the toll terminal 5 in step 42, and from the transaction server 9 via the data link 15 in step 43, to associate the substitute identifier AL# and the vehicle device identifier OID, which were respectively also transmitted in these steps. The previously assigned identifiers OID, AL# are then stored in a database 45 of the toll server 4 for further use during charging (step 46).

The toll server 4 could store additional data in step 46 for later verification, for example, the authorization data AuDat itself or further personal, vehicle-related and/or transaction-related data obtained during the process 31 at the toll terminal 5 and transmitted to the toll server 4 in step 42.

The toll server 4 then uses the substitute identifier AL# and/or the vehicle device identifier OID for managing or identifying a personal and/or vehicle-related toll account 47 for charging toll transactions in the road toll system 1. FIG. 2 shows some exemplary toll transactions 48, which are initiated by the subsystems 16, 17 to determine position usages by vehicles 2 and to generate toll-relevant data, so-called "toll values" M$ for the toll server 4. Depending on the architecture of the road toll system 1, the toll values M$ can be lists of individual position usages, for example in the form of a vehicle device identifier OID together with a beacon identifier BID, or they can be finished individual or cumulative toll calculation results, or a mixture of these variants, and can be sent via the DSRC beacons 19 or the self-locating OBUs 24 and the wireless network 27, with a vehicle device identifier OID in each case, to the toll server 4. The toll server 4 debits (or credits) the toll value or values M$ to the toll account 47 assigned to the vehicle device identifier OID.

For subsequent charging of the position usages of a vehicle 2 via the payment transaction system 8, a user returns the OBU 21 or 24 carried in the vehicle 2 at any desired distributor station 7 in step 49, whereby (or wherein) the vehicle device identifier OID is again disclosed to the toll terminal 5 (process 50). The toll terminal 5 then sends a charging request RC to the toll server 4 in step 51. A charging request RC can of course also take place without return of an OBU 21, 24, e.g., in case of an exchange of two OBUs 21, 24, or by inputting the vehicle device identifier OID into the toll terminal 5. It could also be generated directly in the toll server 4 if certain events occur, e.g., at the end of the month for monthly charging, in which case steps 49-51 are unnecessary.

In a subsequent process 52 initiated by the charging request RC, the toll server 4 acquires the substitute identifier AL# assigned to the vehicle device identifier OID from the database 45, see steps 53 and 54. In step 55, the toll server 4 then sends the toll value or values M$ for the toll transactions 48—or a value M$ accumulated from them in the toll terminal 47—under the substitute identifier AL# to the transaction server 9 and terminates the process 52, also closing the toll account 47 if applicable. It is also possible to transmit additional data in step 55, e.g., the authorization data AuDat for additional security of authenticity.

The transaction server 9 then undertakes the charging based on the payment card 12 or its card identifier CC#. Both a credit and a debit can be effected with the payment card 12. After receipt of the toll value or values M$ and the substitute identifier AL# from the toll server 4 in step 55, the transaction server 9 first acquires therefrom the card identifier CC# belonging to the substitute identifier AL# from the database 41 in a process 56, see steps 57 and 58. The toll value or values M$ are then debited from or credited to the card account 37 with the card identifier CC# in step 59, which terminates the charging process for the position usages. There can also be a confirmation message COK ("charge OK") for the charging process to the toll server 4 from the transaction server 9.

As is symbolized by the blocks 60 and 61 in FIG. 2, the payment transaction system 8 is a secured payment transaction system 8. The points of contact between the road toll system 1 and the secured payment transaction system 8 are limited to a minimum: there is a data transmission between the toll server 4 and the transaction server 9 only in step 43, transmission of the authorization data AuDat and the substitute identifier AL# to the toll server 4, and step 55, transmission of the calculated toll value M$ and the substitute identifier AL# to the transaction server 9; and there is a data exchange on the level of the toll terminal 5 and the transaction terminal 10, connected in a distributor station 7, only as part of the authorization process 33.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for charging fees for position usages of vehicles in a road toll system by a payment transaction system, the road toll system comprising a central toll server and decentralized toll terminals connected thereto and at least one subsystem for determining the position usages of the vehicles in cooperation with respective vehicle devices carried by the vehicles, wherein the payment transaction system comprises a transaction server and decentralized transaction terminals connected thereto for charging payment transactions by payment cards, and wherein at least one toll terminal is connected to at least one transaction terminal, the method comprising:
    receiving an unambiguous identifier of a vehicle device by a toll terminal;
    receiving a transaction value and an unambiguous card identifier of a payment card by a transaction terminal as a payment transaction, transmitting an authorization request containing the payment transaction from the transaction terminal to the transaction server, and authorizing the payment transaction and generating associated authorization data in the transaction server;
    transmitting the authorization data from the transaction server to the transaction terminal and transmitting the authorization data to the toll terminal;
    generating a substitute identifier unambiguously assigned to the card identifier by the transaction server;
    transmitting the authorization data and the substitute identifier from the transaction server to the toll server;
    transmitting the authorization data and the vehicle device identifier from the toll terminal to the toll server;
    associating the substitute identifier and the vehicle device identifier by the toll server based on the authorization data received with the substitute identifier and the vehicle device identifier;
    determining position usages of a vehicle carrying the vehicle device;
    calculating at least one toll value based on the position usages determined with respect to the vehicle device identifier of said vehicle by the road toll system;
    transmitting a charging request containing the vehicle device identifier from a toll terminal to the toll server;
    determining the substitute identifier assigned to the received vehicle device identifier by the toll server and transmitting the determined substitute identifier and said at least one calculated toll value from the toll server to the transaction server; and
    determining the card identifier assigned to the received substitute identifier by the transaction server and charging said at least one calculated received toll value, based on the card identifier.

2. The method according to claim 1, wherein the transaction value is transmitted in the step of transmitting the authorization data and the vehicle device identifier from the toll terminal to the toll server.

3. The method according to claim 1, wherein the transaction value is transmitted in the step of transmitting the authorization data and the substitute identifier from the transaction server to the toll server.

4. The method according to claim 1, wherein the authorization data contains an authorization code, a time stamp of an authorization and an unambiguous identifier of the aforementioned transaction terminal.

5. The method according to claim 1, wherein extra personal or vehicle-related data is acquired in the step of receiving the unambiguous vehicle device identifier at the toll terminal and is transmitted in the step of transmitting the authorization data and the vehicle device identifier from the toll terminal to the toll server.

6. The method according to claim 1, wherein several vehicle device identifiers are assigned to a single substitute identifier in the toll server under a contract identifier.

7. The method according to claim 1, wherein at least one subsystem acquires position usages via a network of geographically distributed radio beacons that communicate with vehicle devices via dedicated short-range communication.

8. The method according to claim 1, wherein at least one subsystem acquires position usages via self-locating vehicle devices using a global satellite navigation system that communicate with the toll server via a wireless network.

9. The method according to claim 1, wherein the step of receiving the transaction value into the transaction terminal takes place via data transmission from the toll terminal to the transaction terminal.

10. The method according to claim 1, wherein a credit card payment transaction system is utilized as the payment transaction system.

* * * * *